United States Patent [19]
Erickson

[11] Patent Number: 6,164,766
[45] Date of Patent: *Dec. 26, 2000

[54] AUTOMATIC INK REFILL SYSTEM FOR DISPOSABLE INK JET CARTRIDGES

[75] Inventor: Paul R. Erickson, Prior Lake, Minn.

[73] Assignee: Colorspan Corporation, Eden Prairie, Minn.

[*] Notice: This patent is subject to a terminal disclaimer.

[21] Appl. No.: 09/257,450

[22] Filed: Feb. 25, 1999

Related U.S. Application Data

[63] Continuation of application No. 08/972,829, Nov. 18, 1997, Pat. No. 5,877,793, which is a continuation of application No. 08/844,027, Apr. 18, 1997, abandoned, which is a continuation-in-part of application No. 08/342,898, Nov. 21, 1994, abandoned, which is a continuation of application No. 08/231,275, Apr. 22, 1994, Pat. No. 5,367,328, which is a continuation-in-part of application No. 08/139,576, Oct. 20, 1993, Pat. No. 5,369,429.

[51] Int. Cl.⁷ ..................................... B41J 2/175
[52] U.S. Cl. ............................................. 347/85
[58] Field of Search .............................. 347/7, 84, 85, 347/86, 87, 30

[56] References Cited

U.S. PATENT DOCUMENTS

| 3,452,361 | 6/1969 | Williams, Jr. . |
| 3,708,798 | 1/1973 | Hildenbrand et al. .................. 347/49 |

(List continued on next page.)

FOREIGN PATENT DOCUMENTS

| 0 442 485 | 8/1991 | European Pat. Off. . |
| 2305176 | 8/1974 | Germany . |

(List continued on next page.)

OTHER PUBLICATIONS

HP 51680A, Hewlett–Packard Specifications Sheet.
HP 51626A Print Cartridge, Hewlett–Packard Specifications Sheet, Sep. 1993.
HP 51369 User Information, Hewlett–Packard Specification Sheet, Nov.1992.
Erturk et al., "Ink Retention in a Color Thermal Inkjet Pen", DHewlett–Packard Journal, pp. 41–44, Aug. 1988.
British Search Report 9415697.0 dated Nov. 23, 1994.
British Search Report 9418698.8 dated Nov. 23, 1994.
German Search Report P44 25 693.0 dated Nov. 8, 1994.
German Search Report P44 25 694.9–27 dated Nov. 9, 1994.
Netherlands Search Report 9400835 dated Oct. 19, 1994.
Netherlands Search Report 9400996 dated Oct. 25, 1996.
PCT Search Report PCT/US94/06226 dated Sep. 16, 1994.
PCT Search Report PCT/US94/06227 dated Sep. 20, 1994.

*Primary Examiner*—N. Le
*Assistant Examiner*—Anh T. N. Vo
*Attorney, Agent, or Firm*—Patterson, Thuente, Skaar & Christensen, P.A.

[57] ABSTRACT

An ink refill system is provided for an ink jet printer having a print carriage that traverses across a print medium and is adapted to receive one or more ink jet cartridges. The ink refill system includes a disposable ink jet cartridge removably mountable in the print carriage and constructed as a self-contained unit that includes a print head and an ink supply container that stores a first quantity of liquid ink at a given negative pressure hydrodynamic condition. An ink reservoir external to the print carriage stores a second quantity of ink for replenishing the first quantity of ink in the ink supply container. Flexible supply tubing couples the ink reservoir to the ink supply container to supply ink from the second quantity of ink to the first quantity of ink during operation of the ink jet printer as the print carriage traverses across the print medium. A mechanism for refilling the ink supply container of the ink jet cartridge from the external ink reservoir during operation of the ink jet printer as the print carriage traverses across the print medium operates such that the refilling of the ink supply container is accomplished in a manner that preserves the negative pressure hydrodynamic condition of the ink jet cartridge.

23 Claims, 9 Drawing Sheets

U.S. PATENT DOCUMENTS

| | | | |
|---|---|---|---|
| 3,961,337 | 6/1976 | Jung et al. | 347/89 |
| 3,967,286 | 6/1976 | Andersson et al. | 347/87 |
| 4,074,284 | 2/1978 | Dexter et al. | 347/49 |
| 4,178,595 | 12/1979 | Jinnai et al. | 347/7 |
| 4,183,131 | 1/1980 | Seya et al. | 29/434 |
| 4,187,511 | 2/1980 | Robinson | 347/7 |
| 4,342,041 | 7/1982 | Kasugayama et al. | 347/85 |
| 4,342,042 | 7/1982 | Cruz-Uribe et al. | 347/87 |
| 4,383,263 | 5/1983 | Ozawa et al. | 347/30 |
| 4,394,669 | 7/1983 | Ozawa et al. | 347/86 |
| 4,399,446 | 8/1983 | McCann et al. | 347/89 |
| 4,403,233 | 9/1983 | Terasawa et al. | 347/30 |
| 4,429,320 | 1/1984 | Hattori et al. | 347/86 |
| 4,432,005 | 2/1984 | Duffield et al. | 347/86 |
| 4,433,341 | 2/1984 | Thomas | 347/6 |
| 4,437,104 | 3/1984 | Hudson | 347/86 |
| 4,462,037 | 7/1984 | Bangs et al. | 347/85 |
| 4,475,116 | 10/1984 | Sicking et al. | 347/86 |
| 4,500,895 | 2/1985 | Buck et al. | 347/87 |
| 4,513,297 | 4/1985 | Okamura | 347/85 |
| 4,527,175 | 7/1985 | Kojima et al. | 347/85 |
| 4,558,326 | 12/1985 | Kimura et al. | 347/30 |
| 4,593,294 | 6/1986 | Parisi | 347/49 |
| 4,610,202 | 9/1986 | Ebinuma et al. | 101/364 |
| 4,623,905 | 11/1986 | Ichihashi et al. | 347/86 |
| 4,631,556 | 12/1986 | Watanabe et al. | 347/30 |
| 4,636,814 | 1/1987 | Terasawa | 347/86 |
| 4,639,738 | 1/1987 | Young et al. | 347/89 |
| 4,658,272 | 4/1987 | Toganch et al. | 347/85 |
| 4,677,448 | 6/1987 | Mizusawa et al. | 52/12 |
| 4,680,696 | 7/1987 | Ebinuma et al. | 347/85 |
| 4,684,962 | 8/1987 | Hirosawa et al. | 347/85 |
| 4,714,937 | 12/1987 | Kaplinsky | 347/86 |
| 4,737,801 | 4/1988 | Ichihashi et al. | 347/85 |
| 4,757,331 | 7/1988 | Mizusawa | 347/85 |
| 4,775,871 | 10/1988 | Abe et al. | 347/85 |
| 4,791,438 | 12/1988 | Hanson et al. | 347/87 |
| 4,794,409 | 12/1988 | Cowger et al. | 347/87 |
| 4,823,146 | 4/1989 | Cooke et al. | 347/86 |
| 4,831,389 | 5/1989 | Chan | 347/86 |
| 4,833,491 | 5/1989 | Rezanka | 347/43 |
| 4,885,595 | 12/1989 | Kaplinsky et al. | 347/85 |
| 4,921,811 | 5/1990 | Watanabe et al. | 347/31 |
| 4,926,196 | 5/1990 | Mizoguchi et al. | 347/23 |
| 4,929,963 | 5/1990 | Balazar | 347/89 |
| 4,931,811 | 6/1990 | Cowger et al. | 347/87 |
| 4,931,812 | 6/1990 | Dunn et al. | 347/87 |
| 4,959,667 | 9/1990 | Kaplinsky | 347/87 |
| 4,967,207 | 10/1990 | Ruder | 347/7 |
| 4,968,998 | 11/1990 | Allen | 347/7 |
| 4,970,533 | 11/1990 | Saito et al. | 347/7 |
| 4,973,993 | 11/1990 | Allen | 347/7 |
| 4,977,413 | 12/1990 | Yamanaka et al. | 347/7 |
| 4,992,802 | 2/1991 | Dion et al. | 347/87 |
| 4,999,652 | 3/1991 | Chan | 347/86 |
| 5,021,809 | 6/1991 | Abe et al. | 347/86 |
| 5,040,001 | 8/1991 | Dunn et al. | 347/86 |
| 5,051,759 | 9/1991 | Karita et al. | 347/87 |
| 5,079,570 | 1/1992 | Mohr et al. | 347/7 |
| 5,101,219 | 3/1992 | Gerber et al. | |
| 5,121,132 | 6/1992 | Pan et al. | |
| 5,126,767 | 6/1992 | Asai | 347/86 |
| 5,136,305 | 8/1992 | Ims | 347/7 |
| 5,159,348 | 10/1992 | Dietl et al. | 347/89 |
| 5,182,579 | 1/1993 | Haruta et al. | 347/87 |
| 5,187,498 | 2/1993 | Burger | 347/86 |
| 5,189,438 | 2/1993 | Hine et al. | 347/89 |
| 5,245,360 | 9/1993 | Ebinuma et al. | 347/86 |
| 5,245,365 | 9/1993 | Woodard et al. | 347/86 |
| 5,280,300 | 1/1994 | Fong et al. | 347/87 |
| 5,289,211 | 2/1994 | Morandotti et al. | 347/7 |
| 5,309,180 | 5/1994 | Uchida | 347/30 |
| 5,367,328 | 11/1994 | Erickson | 347/7 |
| 5,369,429 | 11/1994 | Erickson | 347/7 |
| 5,877,793 | 3/1999 | Erickson | 347/85 |

FOREIGN PATENT DOCUMENTS

| | | |
|---|---|---|
| 2336485 | 2/1975 | Germany . |
| 3034264 | 4/1981 | Germany . |
| 9 300 133 | 6/1993 | Germany . |
| 93010 026 U | 9/1993 | Germany . |
| 55139268 | 10/1980 | Japan . |
| 55146768 | 11/1980 | Japan . |
| 194854 | 11/1984 | Japan . |
| 179258 | 9/1985 | Japan . |
| 61022953 | 1/1986 | Japan . |
| 64751 | 3/1988 | Japan . |
| 147651 | 6/1988 | Japan . |
| 272858 | 12/1991 | Japan . |
| 25465 | 1/1992 | Japan . |
| 162326 | 6/1993 | Japan . |
| WO 88/08514 | 11/1988 | WIPO . |

AUTOMATIC INK REFILL SYSTEM FOR DISPOSABLE INK JET CARTRIDGES

RELATED APPLICATION

This is a Continuation of application Ser. No. 08/972,829 filed Nov. 18, 1997 U.S. Pat. No. 5,877,793, which is a Continuation of application Ser. No. 08/844,027 filed Apr. 18, 1997, now abandoned, which is a Continuation-in-part of application Ser. No. 08/342,898, filed Nov. 21, 1994, now abandoned, which is a Continuation of application Ser. No. 08/231,275 filed Apr. 22, 1994, now U.S. Pat. No. 5,367,328, which is a Continuation-In-Part of application Ser. No. 08/139,576 filed Oct. 20, 1993, now U.S. Pat. No. 5,369,429.

The present invention is a continuation-in-part application of an application filed with the United States Patent and Trademark Office on Oct. 20, 1993, Ser. No. 08/139,576, entitled CONTINUOUS INK REFILL SYSTEM FOR DISPOSABLE INK JET CARTRIDGES HAVING A PREDETERMINED INK CAPACITY, which is assigned to the assignee of the present invention.

TECHNICAL FIELD OF THE INVENTION

The present invention relates generally to ink jet printers. More specifically, the present invention relates to an automatic ink refill system for disposable ink jet cartridges that refills the ink jet cartridges in a manner that preserves the hydrodynamic properties of the ink jet cartridge.

BACKGROUND OF THE INVENTION

Ink jet printers and plotters are well known. The print quality of these printers is dependent on the consistent, successful functioning of the ink jet print heads which are susceptible to clogging and failure over time. To overcome the problems with deterioration of ink jet print heads over time, it is necessary to periodically replace the print heads. Early solutions to this problem replaced only the print head, as shown, for example, in U.S. Pat. No. 4,074,284. More recently, disposable ink jet cartridges have been developed to solve this problem, as described, for example, in U.S. Pat. Nos. 4,500,895, 4,921,811, 4,931,812 and 5,182,579.

Disposable ink jet cartridges of this type are designed to operate for a useful life such that the head elements will function a very high percentage of the time (e.g., 99% of the time) during the life of the disposable cartridge. To ensure that this demanding performance figure is maintained, conventional disposable ink jet cartridges have a predetermined amount of ink contained within the cartridge that is available to be dispensed through the print head. The maximum amount of ink that is contained in the disposable cartridge is a function of how much printing the print head elements can do before failing to function at the very high performance percentage. Once the predetermined amount of ink in the cartridge is used, the entire ink jet cartridge is discarded.

While the use of disposable cartridges has effectively guaranteed the print quality of ink jet printers at the failure rate dictated by the particular disposable cartridge, there are many print applications which could tolerate a higher potential failure rate in exchange for an extended period of operation of the ink jet print head. Unfortunately, when existing disposable ink jet cartridges run out of ink, the print head is still functioning adequately in the vast majority of cases. Discarding ink jet cartridges that still have adequately functioning print heads wastes resources. In addition, frequent replacement of ink jet cartridges is time and labor intensive for large print applications. Consequently, many users have resorted to refilling ink jet cartridges in order to prolong the useful life of the print heads.

Manually refilling ink jet cartridges can be a messy and potentially hazardous operation that requires significant mechanical skill. To manually refill an ink jet cartridge, a user must access the original ink supply container in the ink jet cartridge and pump, pour, or otherwise force ink into that supply container. Accessing any of the ink couplings exposes the user to the ink and the ink to contamination. In addition, the user may inadvertently introduce air bubbles into the system which affects the flow of the ink and its ability to provide crisp, even print.

Automatic ink supply and refill systems for ink jet printers that do not use disposable ink jet cartridges typically are known. Automatic ink supply and refill systems can be classified either as passive refill systems which rely on gravitational or pressure differentials to cause the ink to flow through the system or active systems which uses some type of pump or mechanical assist to move the ink through the system.

Active ink refill systems have been used with either a continuous ink supply system, such as described in U.S. Pat. Nos. 4,399,466, 4,462,037 and 4,680,696, or an on-demand ink supply system, such as described in U.S. Pat. Nos. 4,074,284 and 4,432,005. The primary reason why these types of active ink refill systems are not useful for refilling a disposable ink jet cartridge is that these systems have print heads that rely on atmospheric or positive pressure hydrodynamic conditions to supply ink to the print nozzles. As such, it is typical that the ink refill system will have a feedback or outlet port on the print head to prevent the hydrodynamic condition of the print head from falling below atmospheric pressure.

Passive ink refill systems have used gravity to feed ink as controlled by a three way valve to feed ink from an ink reservoir to an ink supply container as part of a single replaceable unit that is carried by the print carriage, as described, for example, in U.S. Pat. No. 4,959,667. Early versions of this type of single replaceable unit ink delivery system are shown, for example, in U.S. Pat. Nos. 4,714,937 and 4,885,595. This method may be useful when the print heads are printing vertically and the ink reservoir can be positioned behind the print heads and above the ink supply container. When the print heads are printing on a large horizontal surface, however, the print head performance would be greatly diminished if the weight and volume of a large reservoir of ink would need to be supported by the print carriage as it traversed across the print medium.

For all of these reasons, almost all existing ink refill systems for use with disposable ink jet cartridges involve some type of service station which refills the ink jet cartridge only when the print carriage is at one or the other end of the print axis so that the ink jet cartridges can be docked with the service station. Once docked, the ink reservoir in the ink jet cartridge is quickly refilled and the print carriage is allowed to return to its printing operation. Various examples of service station-type ink refill systems for disposable ink jet cartridges are shown in U.S. Pat. Nos. 3,967,286, 4,831,389, 4,967,207, 4,968,998, 4,999,652 and 5,136,305.

There are two basic problems with service station-type ink refill systems. First, the print speed of the ink jet printer is decreased by the time required to perform the docking and refill operation. Second, and more importantly, in order to minimize the time of the docking and refill operation, the ink is quickly transferred to the ink jet cartridge at a pressure that typically exceeds the nominal hydrodynamic properties of the ink jet cartridge. As a result, there can be leaking or weeping of the print heads during the refill operation. The problems of leaking or weaping of ink are discussed, for example, in Ertuk, E., et al., "Ink Retention in a Color Thermal Inkjet Printer", *Hewlett-Packard Journal,* August 1988, pp. 41–44.

While the use of disposable ink jet cartridges has significantly increased the print quality of ink jet printers, this increase in print quality has come at the expense of a significant waste of resources in the form of empty ink jet cartridges that still have long periods of usable life remaining for the print heads. Existing techniques to refill disposable ink jet cartridges suffer from numerous drawbacks. Consequently, an automatic ink refill system for disposable ink jet cartridges that improved on the existing techniques for refilling disposable ink jet cartridges would be greatly appreciated.

SUMMARY OF THE INVENTION

The present invention is an ink refill system for an ink jet printer having a print carriage that traverses across a print medium and is adapted to receive one or more ink jet cartridges. The ink refill system includes a disposable ink jet cartridge removably mountable in the print carriage and constructed as a self-contained unit that includes a print head and an ink supply container that stores a first quantity of liquid ink at a given negative pressure hydrodynamic condition. An ink reservoir external to the print carriage stores a second quantity of ink for replenishing the first quantity of ink in the ink supply container. Flexible supply tubing couples the external ink reservoir to the ink supply container in the ink jet cartridge to supply ink from the second quantity of ink to the first quantity of ink during operation of the ink jet printer as the print carriage traverses across the print medium. A mechanism for refilling the ink supply container in the ink jet cartridge from the external ink reservoir during operation of the ink jet printer as the print carriage traverses across the print medium operates such that the refilling of the ink supply container is accomplished in a manner that preserves the negative pressure hydrodynamic condition of the ink jet cartridge.

In accordance with a first embodiment of the present invention, the mechanism for refilling the ink supply container is an on-demand, active system that periodically refills the ink supply container in the ink jet cartridge from the external ink reservoir. The on-demand, active system includes a mechanism for sensing when the first quantity of ink in the ink supply container is below a predetermined threshold and a mechanism for pumping from a portion of the second quantity of ink from the external ink reservoir to the ink supply container in the ink jet cartridge in response to the sensing. A foam body is disposed between the ink supply container and the print head such that at least a first surface of the foam body is operably coupled to the print head and a portion of the second quantity of ink is pumped onto a second surface of the foam body from the supply tubing.

In accordance with a first embodiment of the present invention, the mechanism for refilling the ink supply container in the ink jet cartridge is a passive system that continuously refills the ink supply container. In the passive embodiment, the external ink reservoir is a sealed vessel and the supply tubing is fixedly coupled to both the ink supply container in the ink jet cartridge and the sealed external ink reservoir. The mechanism for refilling the ink supply container in the ink jet cartridge includes a mechanism for maintaining a passive pressure differential between the ink reservoir and the ink supply container of the ink jet cartridge.

The disposable ink jet cartridge may be of a type that is sealed to atmosphere. This type of disposable ink jet cartridge maintains a negative pressure within the ink supply container that supplies ink to the print head. Alternatively, the disposable ink jet cartridge may be of a type that is vented to atmosphere. This type of disposable ink jet cartridge contains a capillary foam that supplies ink to the print head under the influence of a slight difference of pressure induced by the capillary action of the foam. The present invention discloses preferred embodiments and related embodiments that address each of these types of disposable ink jet cartridges.

The disposable ink jet cartridge of either the first type or the second type is removably mountable in the print carriage of an ink jet printer that moves laterally with respect to a generally horizontal print receiving media. The disposable ink jet cartridge of either the first type or the second type comprises a self-contained housing, including a print head having a plurality of ink jets, and an ink supply container of sufficient capacity to contain a known first quantity of ink that directly supplies the print head with ink. Connecting tubing communicates with the ink supply container in the cartridge through an aperture in a top surface of the housing for connecting to an external ink reservoir, which provides a second quantity of ink to replenish the first quantity of ink in the ink supply container. The ink reservoir is mounted externally to the print carriage on which the disposable ink jet cartridges are mounted and contains a second quantity of ink that is larger than the first quantity of ink by some multiple.

In accordance with the active, on-demand embodiment, ink is transported within the connecting tubing by means of an active pressure differential induced by automata such as a pump or other volume-displacement mechanism. Ink is transported either to initially prime or subsequently reprime the disposable ink jet cartridge by supplying a first quantity of ink to said ink supply container, or to replenish the first quantity of ink some portion of which has been exhausted therein by normal operation of the print head. An ink level sensing and control apparatus employs an ink level sensor within the ink supply container of the ink jet cartridge that senses the presence or absence of ink at the sensor position. The ink level sensing and control apparatus monitors the state of the ink level sensor and detects when a change of state occurs as the result of the presence or absence of ink at the sensor position. The ink level sensing and control apparatus initiates action in accordance with the change of state of the ink level sensor. That is, it activates or deactivates a pump or other volume-displacement mechanism as means automatic to start and stop the flow of ink from the external ink reservoir to the ink supply container in the ink jet cartridge, thus automatically delivering and refilling ink on-demand.

In a preferred first implementation of the active embodiment, the present invention broadly applies to disposable ink jet cartridges of the first type that is sealed to atmosphere and maintains a negative pressure within the ink supply container. An example of this type of disposable ink jet cartridge is the H-P High Capacity print cartridge available from Hewlett-Packard Company, such as Prod. No. 51626A. In this preferred first embodiment, it is necessary to maintain the negative pressure within the ink supply container to preserve reliable operation of the ink jet cartridge.

If the negative pressure within the ink supply container is not preserved, ink leaks freely from jetting orifices in the print head and normal volumetric control of ink deposition by the print head during printing operation is lost.

As a result of these hydrodynamic properties of the ink jet cartridge, the first quantity of ink within the ink supply container cannot be replenished from an external supply with ink impelled or induced by direct action of a pump or other volume-displacement mechanism, because the negative pressure within the ink supply container would be subsumed by the positive pressure of the incoming ink during replenishment operation. To satisfy this precondition of operational reliability, a buffer reservoir external to the disposable ink jet cartridge is employed that contains capillary foam of sufficient quantity and which exhibits the necessary hydrodynamic properties to preserve the negative pressure within the ink supply container during replenishment operation. In this way, critical hydrodynamic properties inherent to the cartridge design are preserved and operating reliability are maintained. This preferred first implementation of the present invention employs an ink level sensor positioned within an upper cavity of the buffer reservoir, which senses the presence or absence of ink at the sensor position therein.

In a preferred second implementation of the active embodiment, the present invention broadly applies to disposable ink jet cartridges of the second type that is vented to atmosphere and contains a capillary foam. An example of this type of disposable ink jet cartridge is the H-P Low Capacity print cartridge available from Hewlett-Packard Company, such as Prod. No. 51608A. In this preferred second embodiment, it is necessary to preserve the difference of pressure induced by action of the capillary foam between the first quantity of ink immediately available to the print head and the atmosphere in order to maintain reliable operation of the ink jet cartridge during the replenishment operation. If the difference of pressure is not maintained, ink weeps from the jetting orifices of the print head and normal volumetric control of ink deposition by the print head during printing operation is lost.

As a result of these hydrodynamic properties of the ink jet cartridge, the first quantity of ink within the ink supply container of the ink jet cartridge cannot be replenished from an external supply with ink impelled or injected directly into the capillary foam by action of a pump or other volume-displacement mechanism, because the difference of pressure induced by action of the capillary foam within the ink supply container would be subsumed by the positive pressure of the incoming ink during replenishment operation. To satisfy this precondition of operational reliability, it is necessary to preserve the difference of pressure during ink replenishment operation. Accordingly, ink is introduced into the ink supply container of the ink jet cartridge so that the ink freely flows on top of the capillary foam and is absorbed by the capillary foam during replenishment operation, but is not impelled or injected directly into the capillary foam. In this way, critical hydrodynamic properties inherent to the cartridge design are preserved and operating reliability is maintained. This preferred second implementation of the present invention employs an ink level sensor positioned within the ink supply container of the disposable ink jet cartridge, which senses the presence or absence of ink at the sensor position therein.

In accordance with the second embodiment of a passive ink refill system, the pressure differential between the ink supply container in the ink jet cartridge and the external ink reservoir is maintained during operation of the ink jet printer as the print heads expel a volumetric flow rate out of the print heads located near the bottom of the ink jet cartridge. It has been found that the action of the ink jet nozzles in the print heads is capable of drawing a fluid height of 2–3 inches without affecting image quality. In a first embodiment, the ink supply container in the ink jet cartridge is created as a sealed container and the pressure differential creates a vacuum that draws the ink from the ink reservoir to the ink supply container in the ink jet cartridge. In another embodiment, the ink supply container in the ink jet cartridge is not sealed, but contains a foam element that creates the pressure differential via the capillary action of the foam.

DESCRIPTION OF THE PREFERRED EMBODIMENT

The preferred embodiment of the present invention includes both an embodiment for an active ink refill system and an embodiment for a passive ink refill system. While there are differences in the details of the implementation of each embodiment, it will be understood that in both embodiments, there is a mechanism for refilling an ink supply container in a disposable ink jet cartridge from an ink supply external to a print carriage of the ink jet printer. Unlike existing service station-type refill systems, the refilling of the disposable ink jet cartridge in accordance with the present invention occurs during operation of the ink jet printer as the print carriage traverses across a print medium. Unlike existing ink refill systems for ink jet printers that do not use a disposable ink jet cartridge, the refilling of the ink supply container in the ink jet cartridge is accomplished in a manner that preserves the particular hydrodynamic properties of the ink jet cartridge.

Figure 1:
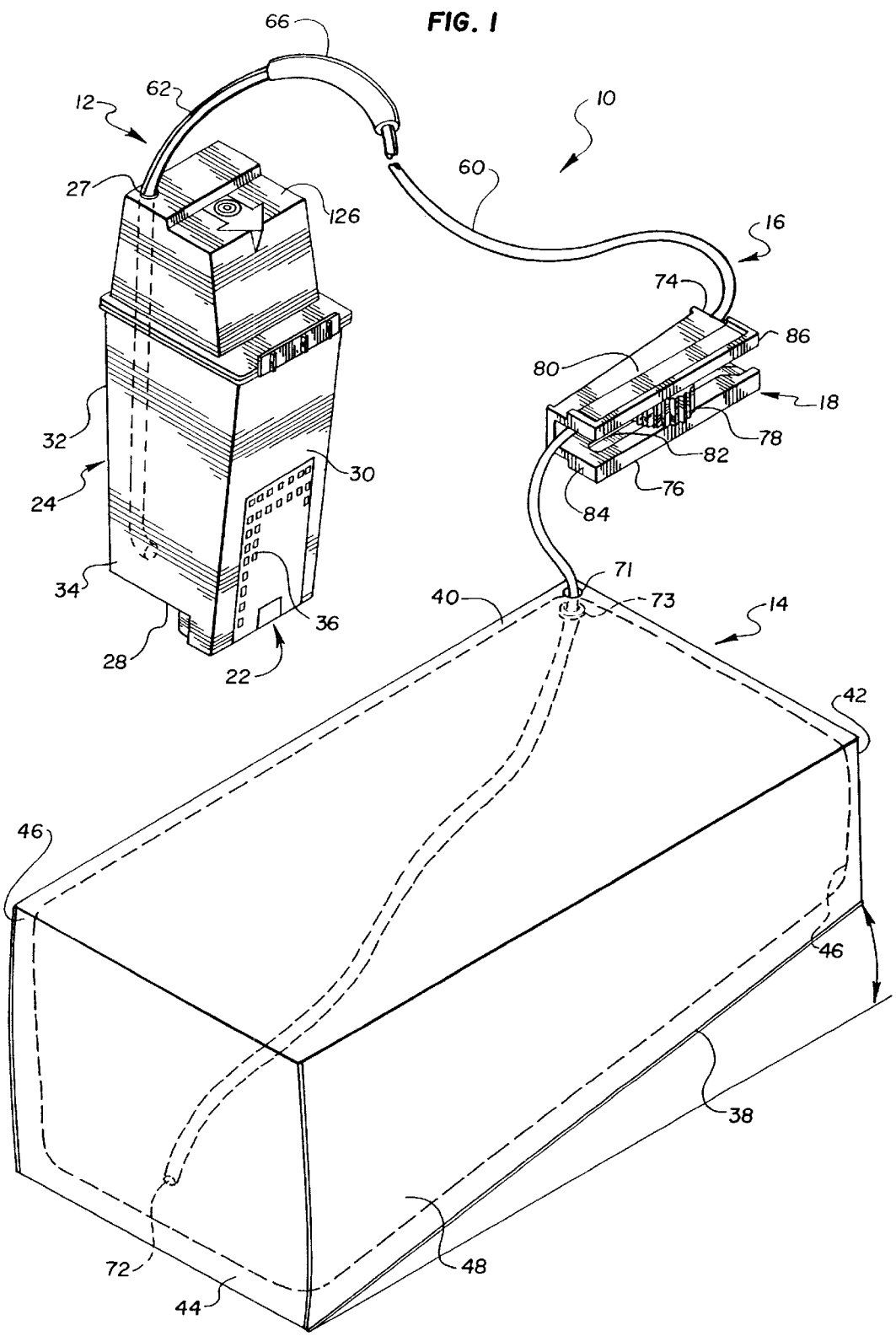
FIG. 1 depicts a perspective view of a passive, continuous ink refill system for disposable ink jet cartridges in accordance with a first embodiment of the present invention with various parts shown in phantom lines.

Reference is now made to the drawings, wherein like reference numerals denote like elements throughout the several views. Referring to FIG. 1, a first preferred embodiment of an ink refill system 10 for an ink jet printer broadly includes a disposable ink jet cartridge 12, an ink reservoir container 14, connecting piping system 16 and an ink flow regulating component 18.

Disposable ink jet cartridge 12 broadly includes a print head 22 and an ink supply container 24 as part of a disposable self-contained unit that presents a cartridge top 26, base 28, front 30, rear 32 and opposed sides 34. As described in more detail in connection with the description of FIGS. 2 and 3, disposable ink jet cartridge 12 is loaded into an ink jet printer 2 by mounting disposable ink jet cartridge 12 in a print carriage 4 that moves laterally with respect to a generally horizontally-oriented print media 6. Print head 22 includes a plurality of head elements 36 that are electrically connected to a control unit (not shown) within ink jet printer 2. Ink supply container 24 is operably coupled to print head 22. Methods of coupling ink supply container 24 to print head 22 are well known in the art as shown, for example, in U.S. Pat. Nos. 4,500,895, 4,921,811 and 4,931,812.

Disposable ink jet cartridge 12 is a HP High Capacity ink jet cartridge, Prod. No. 51626A available from Hewlett-Packard Company, or an equivalent disposable ink jet cartridge, including HP Low Capacity ink jet cartridges having foam inserts, such as Prod. No. 51608A. In a high capacity embodiment, ink supply container 24 can hold at least 40 cc of ink. In a low capacity embodiment, ink supply container 24 holds about 24 cc of ink. In both embodiments, ink jet cartridge 12 has a given hydrodynamic property such that a negative pressure must be maintained between the portion of ink supply container 24 in fluid contact with print head 22 and the atmosphere to prevent the leaking or weeping of ink from the print head orifices of head elements 36. While this negative pressure hydrodynamic property can vary among different types of ink jet cartridges, it is typical for the negative pressure between the portion of ink supply container 24 in fluid contact with print head 22 to be at least about 0.25 inches of water. It will also be understood that the negative pressure hydrodynamic property can be maintained either by having a sealed cartridge, such as the HP High Capacity cartridge, or by providing a foam or foam-like insert within ink supply container 24, such as the HP Low Capacity cartridge.

Figure 5:
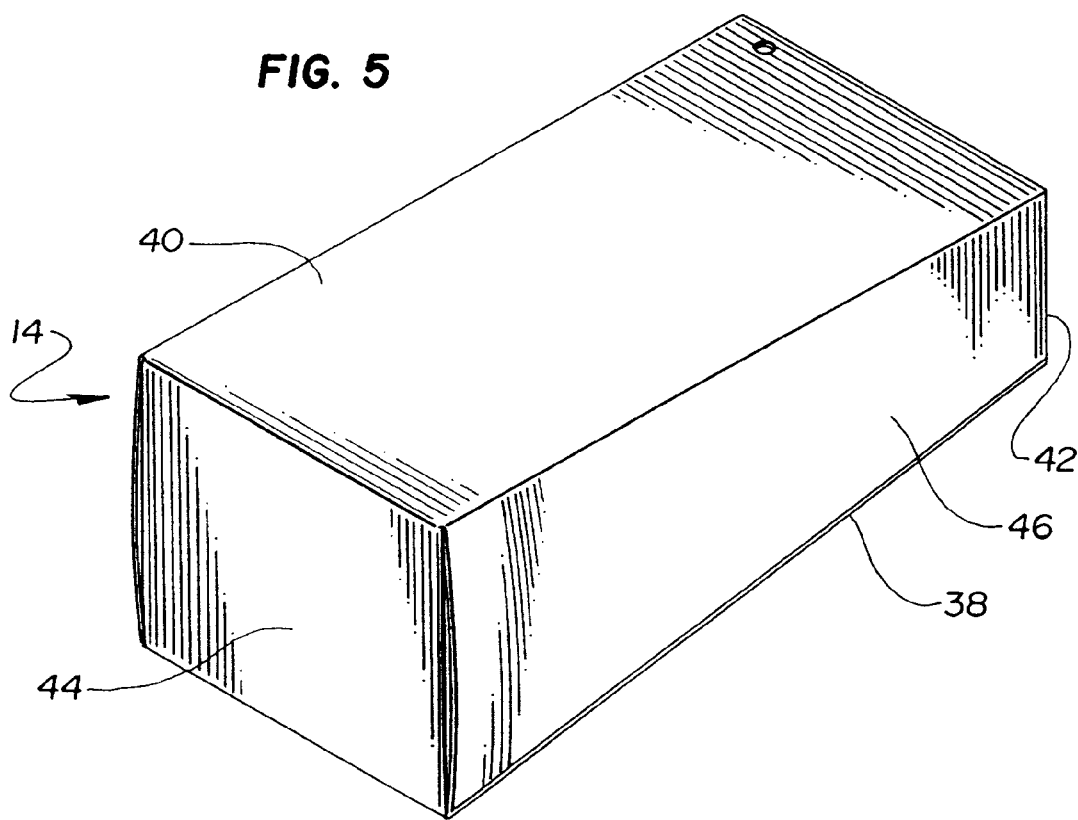
FIG. 5 is a perspective view of an ink reservoir container for the passive ink refill system shown in FIG. 1.

Referring now to FIG. 5, ink reservoir container 14 is a generally rectangular box presenting a reservoir base 38, reservoir top 40, reservoir small end 42, reservoir large end 44, and opposed reservoir sides 46. The reservoir sides are trapezoidal in shape as reservoir base 38 angles upward from reservoir large end 44 to reservoir small end 42. In the preferred embodiment, reservoir base 38 angles upward at a 5 to 15 degree angle relative to a horizontal plane and ink reservoir container 14 carries a characteristic length of 5–7", a characteristic width of 2–4", a small end with a characteristic height of 0.5–2.5", a large end with a characteristic height of 1.5–3.5". Ink reservoir container 14 provides structure defining space of a sufficient volume to hold an ink bag 48. It will be understood that the dimensions of ink reservoir container 14 may change depending on the size of ink bag 48. In the preferred embodiment, ink reservoir container 14 is constructed of rigid heavyweight cardboard glued firmly into the desired shape.

Ink bag 48 is a flexible, pleated envelop adhesively mounted to an interior bottom surface of reservoir base 38 adjacent to large end 44. In the preferred embodiment, ink bag 48 is constructed of a resilient flexible polymer with a metallic foil appearance. Ink bag 48 is of sufficient size to hold a predetermined volume of ink that is several times larger than the volume of ink contained in ink supply container 24. In the preferred embodiment, the predetermined volumes of ink are values which are multiples of the volume of ink stored in ink supply container 24 up to about 400 to 600 cc of ink for a 40 cc volume of ink contained in ink supply container 24. It will be understood that ink bag 48 is used primarily to prevent any spillage of ink during handling of system 10 by a user and that ink bag 48 is not required to effect the creation of the necessary pressure differential for operation of the system.

Referring again to FIG. 1, connecting piping system 16 includes one or more pieces of very flexible tubing 60 extending from ink supply container 24 to ink reservoir container 14. In a preferred embodiment, flexible tubing 60 is inserted through aperture 27 in cartridge top 26 and is extended to a point where a distal end 61 of flexible tubing 60 is located approximately at the bottom of ink supply container 24. Flexible tubing 60 is glued to aperture 27, thereby sealing ink supply container 24 and providing strain relief for flexible tubing 60.

In another embodiment as shown in FIG. 1, connecting piping system 16 includes a formable yet rigid tube 62, flexible tubing 60 and seal 66. Rigid tube 62 is inserted into ink supply container 24 through cartridge top 26 adjacent to cartridge rear 32 and one of the opposed cartridge sides 34 and extends downwardly into ink supply container 24. Rigid tube 62 is joined to cartridge top 26 in an airtight seal and includes appropriate strain relief. Rigid tube 62 includes an upper portion 64 extending upwardly and generally horizontally above cartridge top 26. In this embodiment, tubing 60 is operably joined to upper portion 64 of rigid tubing 62 by seal 66. In this embodiment, seal 66 is a hollow cylinder of a slightly larger diameter than tube 62 and tubing 60 that encloses and overlaps upper end 64 of tube 62 of tubing 60 to form a permanent airtight seal.

Flexible tubing 60 presents a reservoir end 72. In the preferred embodiment, tubing 60 presents an outside diameter of about 0.125 inches and an inside diameter compatible with 1/16 inch tube fittings. Reservoir end 72 extends into the ink bag 48 through aperture 71 and is attached to the ink bag 48 along a bottom interior surface near reservoir large end 44. As with ink supply container 24, reservoir end 72 in ink reservoir container 14 is provided with appropriate strain relief. In a preferred embodiment, the strain relief is provided by affixing a portion of reservoir end 72 around the circumference of a small disc 73 having a diameter greater than aperture 71 that is located inside of ink reservoir 14, but outside of ink bag 48, on small end 42 near aperture 71, for example.

In the preferred embodiment, ink flow regulating component 18 is a stopcock 74. As those skilled in the art will understand, stopcock 74 may be of any type that is switchable between an open and closed position such that ink may flow through piping system 16 when stopcock 74 is in the open position and ink will not flow through piping system 16 when stopcock 74 is in the closed position, such as a conventional quarter-turn ball valve stopcock. In the embodiment shown in FIG. 1, stopcock 74 includes structure defining a tubing channel 76 and a pressure wheel 78. Tubing channel 76 includes a sloped channel floor 80 and opposed side walls 82. Channel floor 80 angles upward from a first end 84 of channel 76 to opposed second end 86. Channel 76 is of sufficient width and depth at the first end 84 to support the tubing 60 and at least half of pressure wheel 78. At second end 86, the depth of channel 76 is less than that at first end 84 and is sufficient to support pressure wheel 78 such that pressure wheel 78 pinches tubing 60 against channel floor 80 to prevent the ink from flowing through tubing 60. One advantage of stopcock 74 over some other types of stopcocks is that stopcock 74 does not require that tubing 60 be cut in order to accommodate the stopcock.

Figure 4:
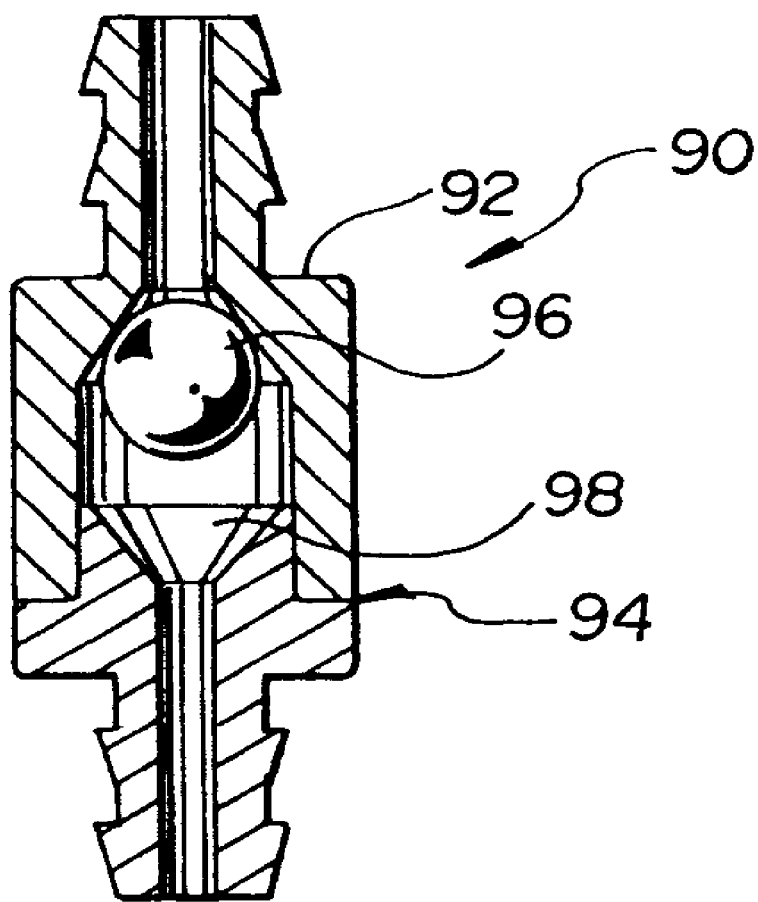
FIG. 4 is a cross-sectional side view of a check value for use with the passive ink refill system shown in FIG. 1.

Referring to FIG. 4, an optional check valve 90 for use with ink reservoir 14 is shown. Check valve 90 is adapted for insertion into 0.125 inch outer diameter tubing and is formed from a top half 92 and bottom half 94, between which ball 96 is allowed to float within interior chamber 98. In this embodiment, ball 96 is 0.125 inches in diameter and is made of polypropylene so that the pressure required to activate check valve 90 is very slight. In normal operation, ball 96 will float to the seat in top half 92 and will be pushed down by a flow of ink in response to a pressure change created by operation of the print heads, for example. In the event that ink reservoir container becomes empty of an air bubble is introduced into piping 16, ball 96 will sink to the seat in bottom half 94 and will prevent the introduction of air into ink jet cartridge 12. Check valve 90 may be positioned either internal to ink reservoir 14, or external to ink reservoir 14, but prior to stopcock 74. In an alternate embodiment, the seat in bottom half 94 is not sealing and no forward flow of ink is prohibited by the check valve. In this embodiment, ink bag 48 must itself be sealed to prevent loss of vacuum inside cartridge 12.

In operation, the passive embodiment of ink refill system 10 is primed by setting ink flow regulating component 18 in an open position and filling ink bag 48 from an external source. Next, all air is purged from piping system 16. Then, disposable ink jet cartridge 12 is lifted vertically to a level at least about two to three inches above the level of the ink in ink bag 48 to allow enough negative pressure to develop inside the disposable ink jet cartridge as to prevent leakage of ink. The flow regulating component 18 is then set in closed position. Priming passive ink refill system 10 minimizes the presence of unwanted air in continuous ink refill system 10 and seals it against contamination. A user receives passive ink refill system 10 ready to be installed in ink jet printer 2.

Figure 2:
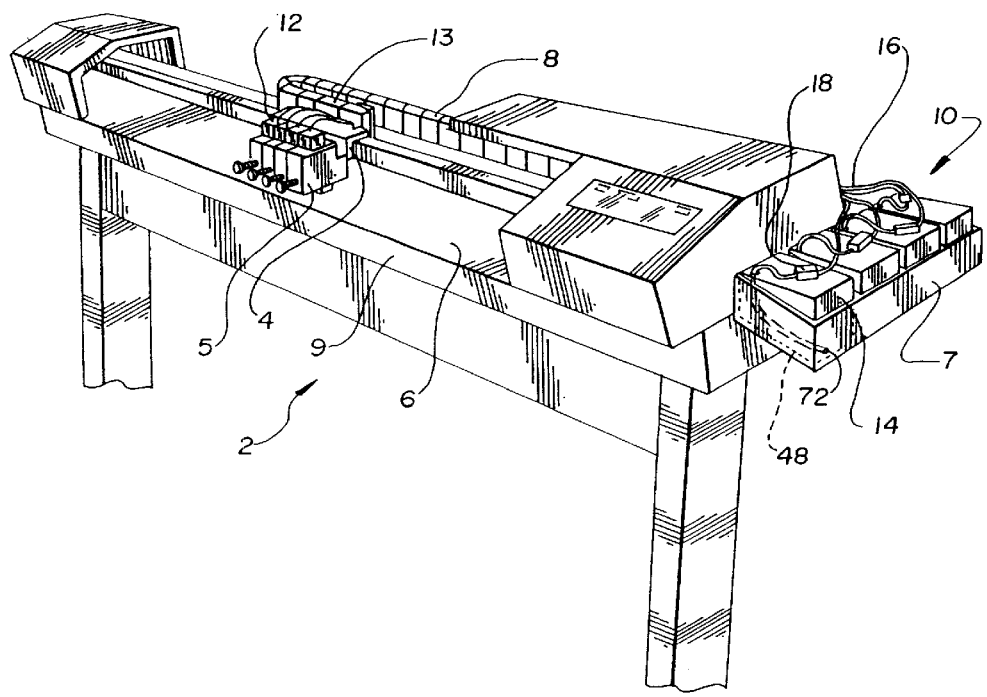
FIG. 2 is a perspective view of the passive ink refill system shown in FIG. 1 as installed in an ink jet printer.
Figure 3:
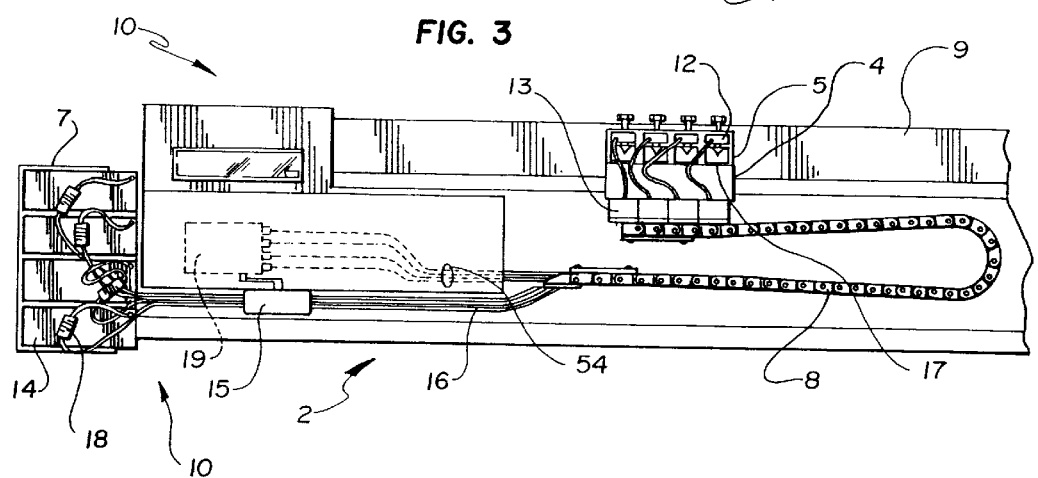
FIG. 3 is a top view of an active, on-demand ink refill system shown in FIG. 6 as installed in an ink jet printer.

Referring to FIGS. 2 and 3, ink jet printer 2 includes a print carriage 4 with a plurality of cartridge holders 5, a reservoir support 7, ink line housing 8 and print platen 9. A disposable ink jet cartridge 12 is installed in a cartridge holder 5 and aligned with other like disposable ink jet cartridges 12 such that each print head 22 is positioned above and adjacent to print platen 9 and is aligned with every other print head 22. Ink reservoir container 14 for the disposable ink jet cartridge 12 is placed in a corresponding partition in reservoir support 7. Piping system 16 extends between ink supply container 24 of disposable ink jet cartridge 12 and ink reservoir container 14 through ink line housing 8. Print platen 9 supports paper or other print media 6 on which a predetermined pattern is to be printed under control of a control unit (not shown).

In one embodiment, reservoir support 7 is positioned such that the bottom of ink reservoir container 14 is about 2 to 3 inches below the bottom of ink supply container 24 in disposable ink jet cartridge 12. This effectively maintains the same passive pressure which the passive embodiment of ink refill system 10 had when originally charged. In an alternate embodiment where a capillary action is used to create the pressure differential between ink reservoir container 14 and ink supply container 24, reservoir support 7 would be positioned such that the bottom of ink reservoir container 14 is essentially level with the bottom of ink supply container 24 in disposable ink jet cartridge 12. This is possible because the capillary action of the foam will create a sufficient pressure drop to maintain negative pressure in ink jet cartridge 12. In both embodiments of the passive embodiment of ink refill system 10, a passive pressure differential is used to convey the ink from ink reservoir container 14 to ink supply container 24 without any mechanical assistance in the form of pumps, etc.

To initiate the flow of ink from ink reservoir container 14 through piping system 16 to ink supply container 24, a user sets ink flow regulating component 18 in an open position. Ink flows from ink reservoir container 14 to ink supply container 24 through the pressure differential between ink container 24 and ink reservoir 14, moving into the vacuum created in the piping system 16 during the priming process. In the preferred embodiment, the ink exits continuous ink refill system 10 through print head 22 when print elements 36 when they are energized in a manner well known in the art. The self-contained, liquid-tight, sealed structure of ink jet refill system 10 maintains the continuous replenishment of ink as long as ink flow regulating component 18 is in the open position. Angled reservoir base 38 of ink reservoir container 14 relies on gravity to maintain ink in contact with reservoir end 72 of tubing 60 as ink bag 48 empties.

The absence of moving mechanical components, such as a pump or mechanical valves, make the passive embodiment of ink jet refill system 10 less prone to mechanical failure. The self-contained structure of the passive embodiment of ink jet refill system 10 makes the system easy to use and install and minimizes the possibility of ink spills or contamination. Passive ink jet refill system 10 provides a consistent and reliable ink flow to print head 22 such that the useful life of conventional disposable ink jet print cartridges 12 is extended beyond its originally designed expiration.

In an active embodiment of the present invention, ink is transferred from external ink reservoir container 14 to ink jet cartridge 12 by a mechanical pump or the like, instead of by a passive pressure differential. Two different implementations of the active ink refill system 10 will be described. Both implementations utilize a foam body to maintain the negative pressure hydrodynamic condition of ink jet cartridge 12; however, in a first implementation, the foam body is external to ink jet cartridge 12, whereas in a second implementation, the foam body is within ink jet cartridge 12.

Figure 6:
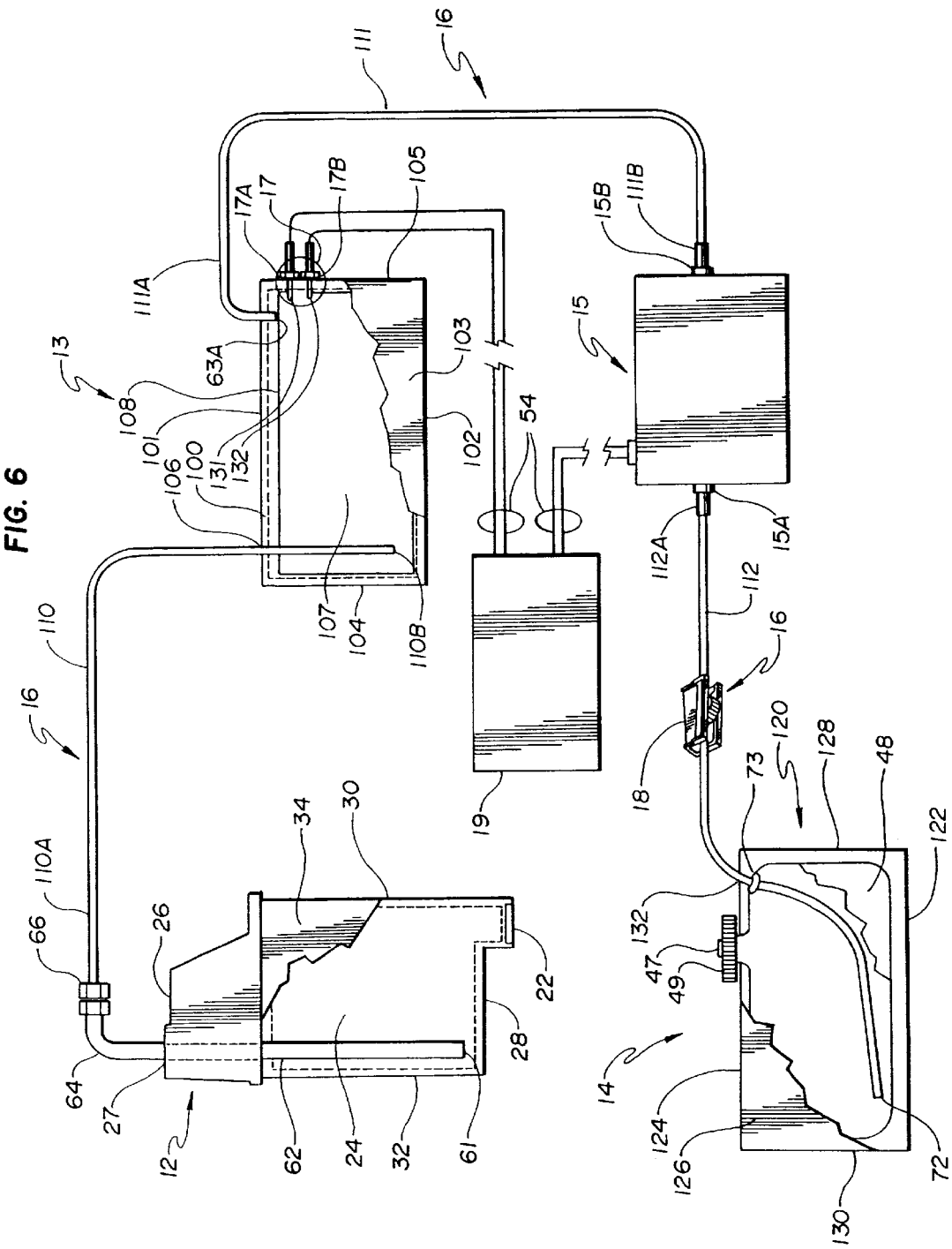
FIG. 6 is a schematic view of a first implementation of an active, on-demand ink refill system for disposable ink jet cartridges in accordance with a second embodiment of the present invention.

Referring now to FIG. 6, a first implementation of an active embodiment of an automatic, on-demand ink refill system 10 for disposable ink jet cartridges used with an ink jet printer broadly includes a disposable ink jet cartridge 12 having a negative pressure hydrodynamic property, a buffer reservoir 13, an external ink reservoir container 14, a pump mechanism 15, connecting piping 16, an ink level sensor 17, ink flow regulating component 18 and ink level sensing and control apparatus 19.

As with the passive embodiment, disposable ink jet cartridge 12 broadly includes a print head 22 and an ink supply container 24 as part of a disposable self-contained unit that presents a cartridge top 26, base 28, front 30, rear 32, and opposed sides 34, In this implementation of the active embodiment of ink refill system 10, disposable ink jet cartridge 12 is an H-P High Capacity print cartridge available from Hewlett-Packard Company, or an equivalent disposable ink jet cartridge with an ink supply container that can hold at least 40 cc of a first quantity of ink. Disposable ink jet cartridge 12 is loaded into an ink jet printer in a manner similar in descriptive detail to that shown in FIGS. 2 and 3 and described previously.

Buffer reservoir 13 is a fluidic-pressure buffering device externally mounted to disposable ink jet cartridge 12 as a self-contained unit that broadly includes an ink supply container 100 which presents a top 101, bottom 102, opposed sides 103, front end 104, and rear end 105, with a small aperture 106 through which the second quantity of ink may be drawn into flexible tubing 110 to replenish the first quantity of ink in ink jet cartridge 12. Ink supply container 100 has sufficient volume to contain a quantity of capillary foam 107 with known hydrodynamic properties and a second quantity of ink. By action induced by capillary foam 107 a small difference of pressure is created within ink supply container 100 sufficient to preserve the negative pressure in disposable ink jet cartridge 12 during replenishment operation.

External ink reservoir 14 is mounted externally to the print carriage on which disposable ink jet cartridge 12 and buffer reservoir 13 are mounted and broadly includes ink supply container 120 as a self-contained unit, or sealable unit with component parts, or enclosable unit, which presents a bottom 122, top 124, opposed sides 126, front end 128, and rear end 130, and includes a small aperture 132 through which a third quantity of ink may be drawn into flexible tubing 112 to replenish the second quantity of ink in buffer reservoir 13. External ink reservoir 14 includes a larger aperture 49 for manually resupplying the third quantity of ink and may include a vent 47 to atmosphere. In the preferred embodiment, ink reservoir 14 comprises an ink supply container 48 comprising a pleated, resilient and tear-resistant, collapsible plastic bag that has sufficient volume to hold the third quantity of ink. In the preferred embodiment, no large aperture 49 for resupplying the third quantity of ink nor vent 47 to atmosphere is required. In another embodiment, external ink reservoir 14 comprises a rigid shell for holding the second quantity of ink, made of glass, plastic, or other suitably formable material. In this embodiment, a large aperture 49 for resupplying the third quantity of ink and a vent 47 to atmosphere is required.

Pump 15 is any volume-displacement mechanism of typical make and manufacture which provides means sufficient and operable to transport ink through connecting piping 16 from external ink reservoir 14 to buffer reservoir 13.

Connecting piping 16 includes three or more pieces of tubing 110, 111 and 112 extending from disposable ink jet cartridge 12, to buffer reservoir 13, to pump 15, to external ink reservoir 14. In the preferred embodiment, flexible tubing 110, 111 and 112 is very resilient and presents an outside diameter of about 0.125 inches and an inside diameter compatible with NPT-standard ¹⁄₁₆-inch tube fittings. In another embodiment, some or all of tubing 110, 111 and 112 may be rigid.

Ink level sensor 17 broadly includes a sensor head operably positioned within ink supply container 100 of the buffer reservoir 13 and extending into upper cavity 108 and operably coupled to transmit a signal to ink level sensing and control apparatus 19. In the preferred embodiment, sensor head 17 comprises a pair of continuity electrodes mounted in one of the sides 103, 104 or 105 of buffer reservoir 13. In another embodiment, sensor head 17 comprises a pair of continuity electrodes mounted in one of the sides 30, 32 or 34 of ink jet cartridge 12. While a pair of continuity electrodes are used as the sensors of sensor head 17, it will be understood that many different types of sensor head for detecting the presence or absence of ink may be used.

As those skilled in the art will understand, ink level sensing and control apparatus 19 broadly employs means sufficient and operable to continuously monitor the current state of ink level sensor 17 and to detect when a change of state occurs as the direct result of the presence or absence of ink in ink supply container 100 or ink supply container 24 at the sensor position. In the preferred embodiment, a state of electrical continuity or relatively low resistance is effected for continuity electrodes 17A and 17B when ink is present at the sensor position. Conversely, a state of electrical discontinuity or relatively high resistance is effected for continuity electrodes 17A and 17B when ink is absent at the sensor position.

Ink level sensing and control apparatus 19 employs means sufficient and operable to initiate actions in accordance with the current state of ink level sensor 17. In the preferred embodiment of this second embodiment, ink level sensing and control apparatus 19 activates pump 15 when a state of electrical discontinuity or high resistance is detected, indicating the absence of ink at the sensor position. Conversely, ink level sensing and control apparatus 19 deactivates pump 15 when a state of electrical continuity or low resistance is detected, indicating the presence of ink at the sensor position.

In operation, when the level of ink in ink supply container 100 or ink supply container 24 falls below the sensor position of continuity electrodes 17A and 17B, electrical continuity is broken by the absence of ink. This change of state is detected by ink level sensing and control apparatus 19, which activates pump 15 to start the flow of ink. Ink is supplied from the second quantity of ink in external ink reservoir 14 to replenish the first quantity of ink in ink supply container 100 or ink supply container 24. Conversely, as the level of ink in ink supply container 100 or ink supply container 24 rises to the sensor position of continuity electrodes 17A and 17B due to the action of pump 15, electrical continuity is re-established by the presence of ink. This change of state is detected by ink level sensing and control apparatus 19, which deactivates pump 15 and halts the flow of ink.

With continued reference to FIG. 6, in the preferred embodiment, connecting piping 16 includes a formable yet rigid tube 62, flexible tubing 110, and seal 66 for connecting to disposable ink jet cartridge 12. Rigid tube 62 is inserted into ink supply container 24 through cartridge top 26 adjacent to cartridge rear 32 and one of the opposed cartridge sides 34 and extends downwardly into ink supply container 24. Rigid tube 62 is joined to cartridge top 26 at aperture 27 in an airtight seal and includes appropriate strain relief. Rigid tube 62 includes an upper portion 64 extending upwardly and generally horizontally above cartridge top 26. Proximal end 110A of flexible tubing 110 is operably joined to upper portion 64 of rigid tube 62 by seal 6. Seal 66 is a coupler of a slightly larger diameter than rigid tube 62 and flexible tubing 110, which encloses and overlaps upper portion 64 of rigid tubing 62 and proximal end 110A of flexible tubing 110 to form an non-permanent but airtight seal. In another embodiment, proximal end 110A of flexible tubing 110 is inserted directly through aperture 27 in cartridge top 26 and is extended downwardly into ink supply container 24 to a point where proximal end 110A is located approximately at the bottom of ink supply container 24. In this embodiment, flexible tubing 110 is glued to aperture 27, thereby sealing disposable ink jet cartridge 12 and providing appropriate strain relief.

Figure 7:
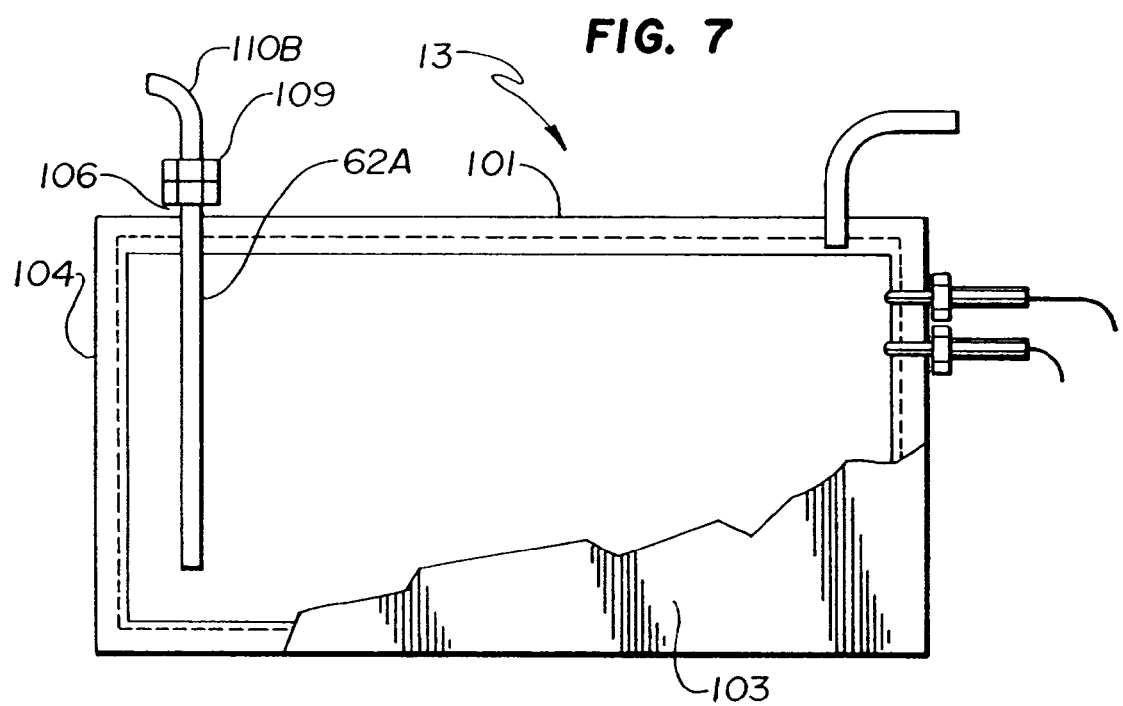
FIG. 7 is a cut-away view of an alternate embodiment of a buffer reservoir container of the active ink refill system shown in FIG. 6.

Flexible tubing 110 presents a distal end 110B. In the preferred embodiment, distal end 110B extends into buffer reservoir 13 through aperture 106 in top 101, adjacent to front end 104 and one of the opposed sides 103, extends downwardly and is attached to buffer reservoir 13 along an interior bottom surface. Flexible tubing 110 is glued to aperture 106, thereby sealing buffer reservoir 13 and providing appropriate strain relief. In another embodiment shown in FIG. 7, rigid tube 62A is inserted into buffer reservoir 13 through top 101 adjacent to front end 104 and one of the opposed sides 103 and extends downwardly into buffer reservoir 13. Rigid tube 62A is joined to top 101 at aperture 106 in an airtight seal and includes appropriate strain relief. Distal end 110B is operably joined to rigid tube 62A by seal 109. Seal 109 is a coupler that forms a non-permanent airtight seal.

Referring again to FIG. 6, flexible tubing 111 presents a proximal end 111A. In the preferred embodiment, proximal end 111A extends into buffer reservoir 13 through aperture 130 in top 101, adjacent to rear end 105 and one of the opposed sides 103 and extends into cavity 108 only insofar as required that ink may freely flow into cavity 108. Flexible tubing 111 is glued to aperture 130, thereby sealing buffer reservoir 13 and providing appropriate strain relief.

Figure 8:
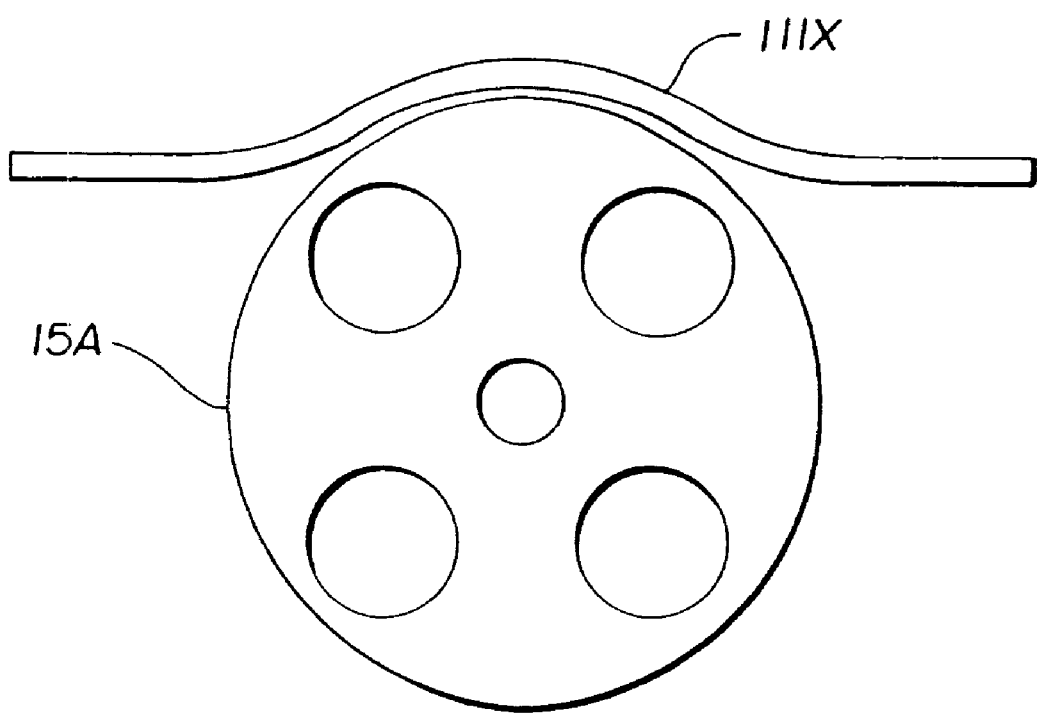
FIG. 8 is a cut-away view of an alternate embodiment of a pumping mechanism of the active ink refill system shown in FIG. 6.

Flexible tubing 111 presents a distal end 111B. In the preferred embodiment, distal end 111B operably connects to pump 15 at outlet port 15B. Similarly, flexible tubing 112 presents proximal end 112A operably connected to pump 15 at inlet port 15A. In another embodiment shown in FIG. 8, flexible tubing 111 and flexible tubing 112 comprise a single unit of flexible tubing 111X, and ink is transported by means operable of peristaltic pump 15C. In this embodiment, as will be understood by those skilled in the art, peristaltic pump 15C impels ink through flexible tubing 111X by alternating constrictions and dilations of the resilient tube walls, an action relating to such pumps well-described in the literature.

Referring again to FIG. 6, flexible tubing 112 presents a distal end 72. In the preferred embodiment, distal end 72 of flexible tubing 112 is inserted through aperture 73 in ink supply container 48 and is extended to a point where distal end 72 is located approximately at the bottom of ink supply container 48. Flexible tubing 112 is glued or otherwise permanently attached to aperture 73, providing appropriate strain relief.

Continuity electrodes 17A and 17B pass through aperture 131 and aperture 132 at rear end 105 of buffer reservoir 13 and extend into cavity 108. Continuity electrodes 17A and 17B are so situated as to create a gap between the electrode pair that effects electrical discontinuity as the normative electrical state and so located as to preclude interference from the flow of ink during replenishment operation. Obviously, the positions of apertures 131 and 132 at rear end 105 of buffer reservoir 13 is merely a matter of convenience for purposes of design, and is not enabling of means operable of the continuity electrodes.

The automatic on-demand ink delivery and refill system is first removably coupled to disposable ink jet cartridge 12 at upper portion 64 of rigid tube 62 by proximal end 110A of flexible tubing 110 and is non-permanently but operably joined in an airtight coupling by seal 66. Power is then applied to ink level sensing and control apparatus 19 to initiate action of the automatic on-demand ink delivery and refill system 10.

It will be understood that, while operably under power, ink level sensing and control apparatus 19 continuously monitors the current state of ink level sensor 17, comprising continuity electrodes 17A and 17B, and detects when an electrical change of state occurs as the result of the presence or absence of ink in ink supply container 100 of buffer reservoir 13 at the sensor position. In other words, when ink is initially absent at the sensor position due to the unprimed condition of buffer reservoir 13, the resultant state of continuity electrodes 17A and 17B is that of electrical discontinuity.

In initial operation of the preferred embodiment, the automatic on-demand ink delivery and refill system is primed when, as a result of the absence of ink within buffer reservoir 13, a state of electrical discontinuity results that is detected by ink level sensing and control apparatus 19, which activates pump 15 to supply the second quantity of ink. An active pressure differential is induced within the ink delivery and resupply system 10 by the volume-displacement action of pump 15 which freely withdraws ink from the third quantity of ink in external ink reservoir 14 and transports it along interior channels of connecting piping 16 to buffer reservoir 13, where it passes through the aperture 130 in top 101 into ink supply container 100 causing buffer reservoir 13 to fill with the second quantity of ink. As the level of ink in ink supply container 100 of buffer reservoir 13 rises to the sensor position of continuity electrodes 17A and 17B due to the action of pump 15, a state of electrical continuity is established between continuity electrodes 17A and 17B and is detected by ink level sensing and control apparatus 19, which deactivates pump 15 and halts the flow of ink. Ink delivery is achieved, the system is primed, and now ready for automatic on-demand replenishment operation.

In continuing operation of the preferred embodiment, ink exits disposable ink jet cartridge 12 through the print head 22 when print elements 36 they are energized in a manner well known in the art. The jetting action of print head 22 during printing operation exhausts some portion of the first quantity of ink in ink supply container 24, reducing the volume of ink therein and causing, by the negative pressure created therein, ink to be freely withdrawn from the second quantity of ink in buffer reservoir 13 through flexible tubing 110 to replenish the first quantity of ink on a continuous basis from the second quantity of ink.

At some point, some portion of the second quantity of ink in buffer reservoir 13 is exhausted to a degree sufficient to cause the level of ink in buffer reservoir 13 to fall below the sensor position of continuity electrodes 17A and 17B. Electrical continuity between continuity electrodes 17A and 17B is broken and this change of state is detected by ink level sensing and control apparatus 19, which activates pump 15 to supply ink. As before, when the level of ink in ink supply container 100 rises to the sensor position of continuity electrodes 17A and 17B due to the action of pump 15, a state of electrical continuity is re-established between the electrode pair and is detected by ink level sensing and control apparatus 19, which deactivates pump 15 and halts the flow of ink.

Figure 9:
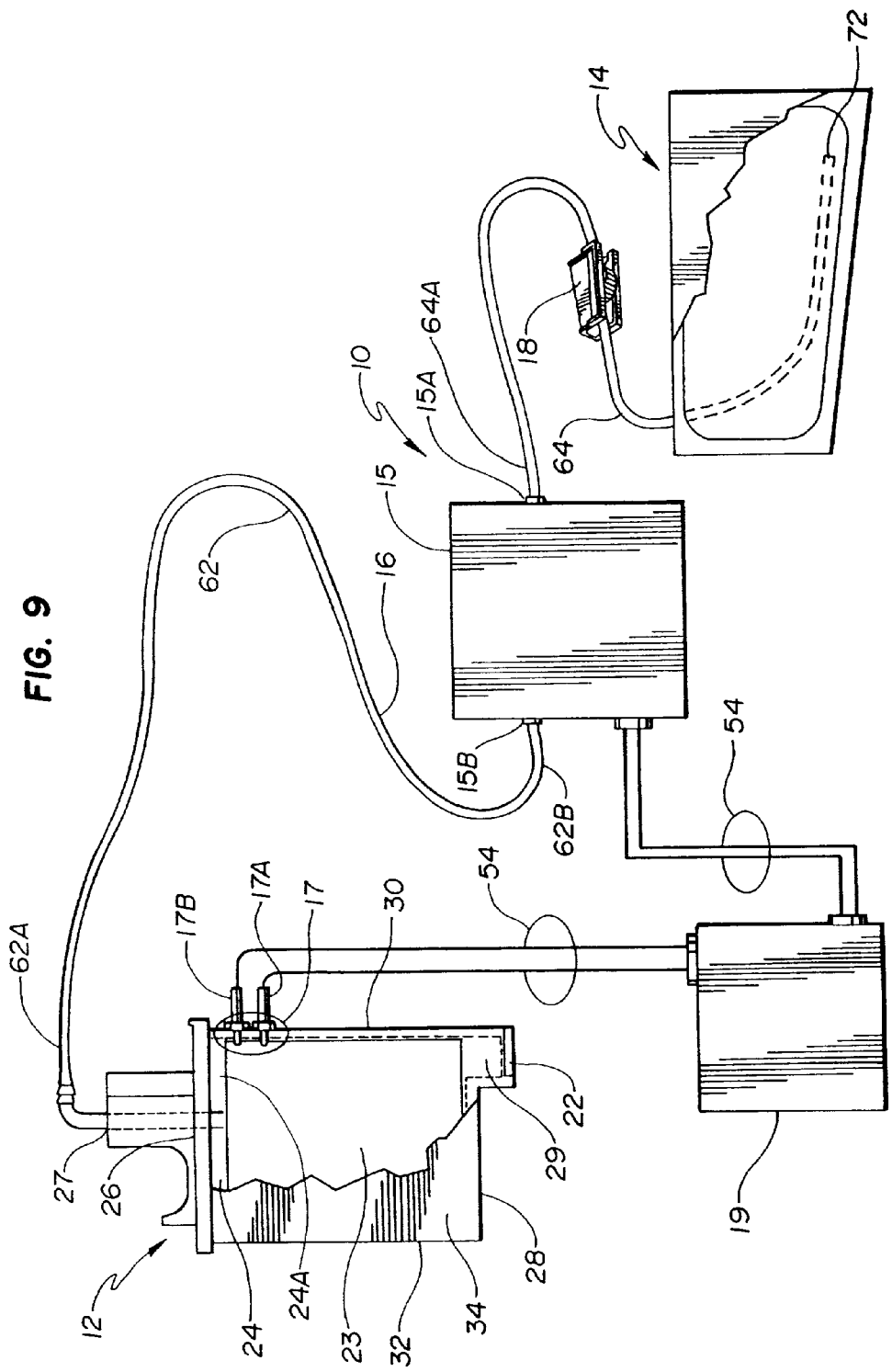
FIG. 9 is a schematic view of a second implementation of an active, on-demand ink refill system for disposable ink jet cartridges in accordance with a second embodiment of the present invention.

Referring now to FIG. 9, a second implementation of the active, on-demand embodiment of ink refill system 10 for disposable ink jet cartridges for use with an ink jet printer broadly includes a disposable ink jet cartridge 12 of the capillary foam type which is vented to atmosphere, external ink reservoir 14, pump 15, connecting piping 16, ink level sensor 17, ink flow regulator 18 and ink level sensing and control apparatus 19.

Disposable ink jet cartridge 12 broadly includes a print head 22 and an ink supply container 24 as part of a disposable self-contained unit that presents a cartridge top 26, base 28, front 30, rear 32, and opposed sides 34. Ink supply container 24 has sufficient volume to contain a quantity of capillary foam 23 with known hydrodynamic properties and a first quantity of ink. By action induced by capillary foam 23 a small difference of pressure is created within ink supply container 24 between the first quantity of ink directly available to the print head 22 and the atmosphere that is sufficient to prevent seepage of ink through the head orifices. In the preferred embodiment, disposable ink jet cartridge 12 is an H-P Low Capacity ink jet cartridge. Capacity print cartridge available from Hewlett-Packard Company, or an equivalent disposable ink jet cartridge with an ink supply container that can hold at least 24 cc of a first quantity of ink. Disposable ink jet cartridge 12 is loaded into an ink jet printer in a manner similar in descriptive detail to that shown in FIGS. 2 and 3 and described previously.

External ink reservoir 14 is similar in descriptive detail to that of the preferred first implementation, both in the preferred embodiment and in other embodiments, as shown in FIG. 6 and described previously.

Pump 15 is similar in descriptive detail to that of the preferred first implementation, both in the preferred embodiment and in other embodiments, as shown in FIG. 6 and described previously.

Connecting piping 16 is similar in descriptive detail to that of the preferred first implementation, both in the preferred embodiment and in other embodiments, as shown in FIG. 6 and described previously.

Ink level sensor 17 is similar in descriptive detail to that of the preferred first implementation, both in the preferred embodiment and in other embodiments, except that ink level sensor 17 is positioned in ink supply container 24 of disposable ink jet cartridge 12, as shown in FIG. 9 and described herein.

Ink level sensing and control apparatus 19 is similar in descriptive detail to that of the preferred first implementation, both in the preferred embodiment and in other embodiments, as shown in FIG. 6 and described previously.

Referring to FIG. 9, in the preferred embodiment, proximal end 62A of flexible tubing 62 is inserted directly through aperture 27 in cartridge top 26 and is extended into ink supply container 24 only insofar as required that ink may freely flow into cavity 24A so as to preserve the difference in pressure induced by action of capillary foam 23. Flexible tubing 62 is affixed to disposable ink jet cartridge 12 in a manner suitable to provide appropriate strain relief.

Figure 10:
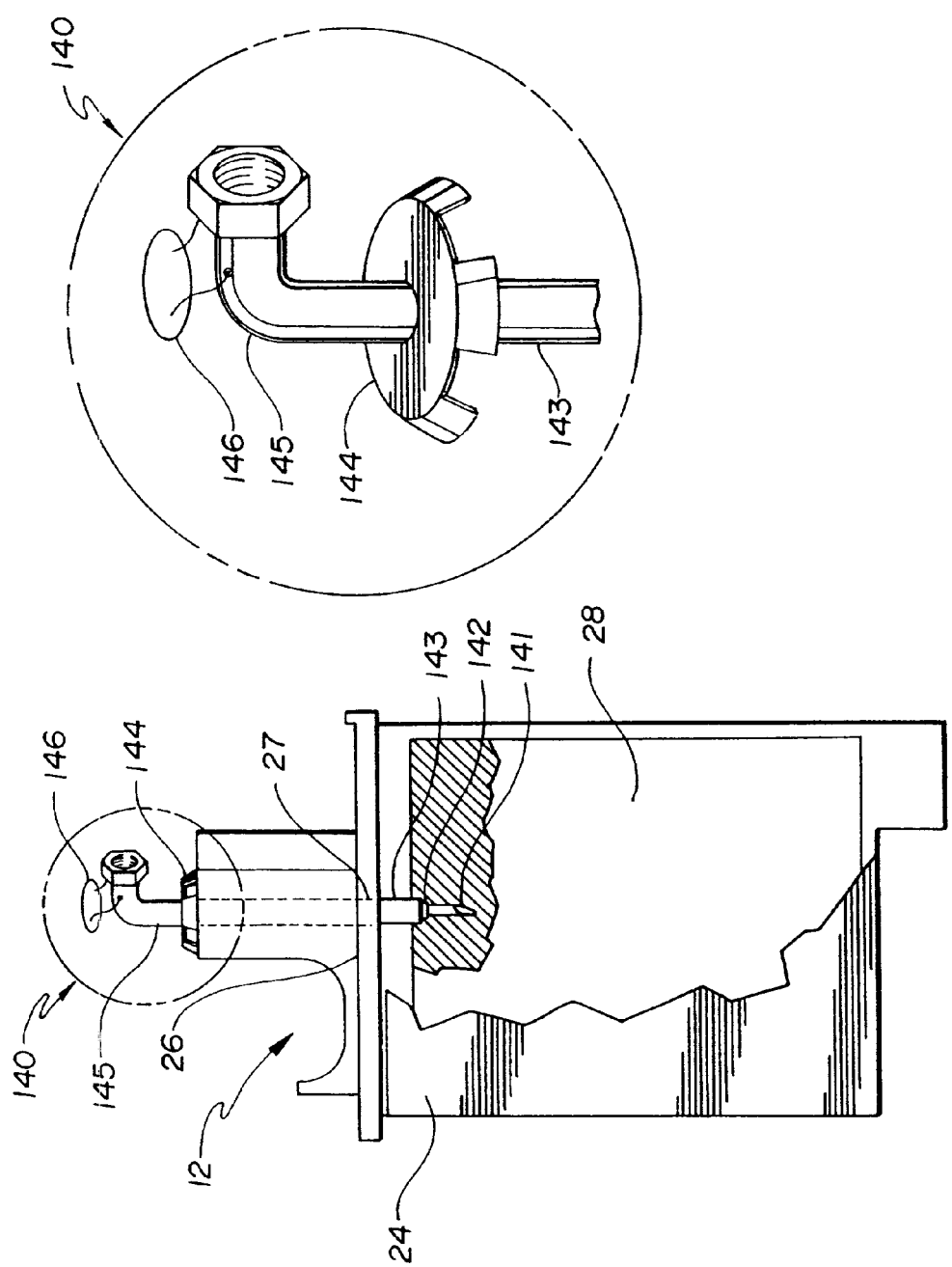
FIG. 10 is a cut-away view of an alternate embodiment of the sensing mechanism of the active ink refill system shown in FIG. 9.

Referring now to FIG. 10, in another embodiment of the preferred second implementation, sensor coupler 140 includes a stainless steel tube 141 which provides a first element of a pair of continuity electrodes, surmounted by an isolation sheath 142 of electrically insulating material, surmounted by stainless steel tube 143 which provides a second element of a pair of continuity electrodes, in which is formed a flange 144. Sensor coupler 140 includes an upper portion 145 extending upwardly and generally above cartridge top 26. Tubes 141 and 143 are electrically isolated and operably joined to electrical conductors 146. Tube 141 is exposed only at the distal end of sensor coupler 140 at a point below distal end of tube 143. In this embodiment, sensor coupler 140 is inserted into disposable ink jet cartridge 12 through aperture 27 at cartridge top 26 and extended downwardly into ink supply container 24 to shallowly penetrate capillary foam 28 to a depth limited by flange 144. Tubes 141 and 143 are thus exposed within ink supply container 24 at a sensor position just below the upper surface of capillary foam 28. Sensor coupler 140 is affixed to disposable ink jet cartridge 12 in a manner suitable to provide appropriate strain relief.

Referring again to FIG. 9, proximal end 62A of flexible tubing 62 is operably joined to upper portion 145 of sensor coupler 140 by seal 65 in a manner similar in descriptive detail to that of the preferred first implementation, shown in FIG. 6 and previously described. A volumetric flow-rate restrictor (not shown) within flexible tube 62 limits the flow of ink through sensor coupler 130 to a degree that does not subsume the difference in pressure induced in ink supply container 24 by action of capillary foam 23.

Flexible tubing 62 presents a distal end 62B which operably connects to pump 15 at outlet port 15B in a manner similar in descriptive detail to that of the preferred first implementation, both in the preferred embodiment and in other embodiments, shown in FIG. 6 and previously described.

Flexible tubing 64 presents a proximal end 64A which operably connects to pump 15 at inlet port 15A in a manner similar in descriptive detail to that of the preferred first implementation, both in the preferred embodiment and in other embodiments, shown in FIG. 6 and previously described.

Flexible tubing 64 presents a distal end 72 which operably connects to external ink reservoir 14 in a manner similar in descriptive detail to that of the preferred first implementation, both in the preferred embodiment and in other embodiments, shown in FIG. 6 and previously described.

In operation, the operational characteristics of the preferred second embodiment, both in its preferred embodiment and in other embodiments, is similar in descriptive detail to that of the preferred first implementation, shown in FIG. 6 and previously described, except that the preferred second embodiment does not include a buffer reservoir. It will be understood that external ink reservoir 14 as shown in FIG. 9 contains the second quantity of ink which is freely withdrawn by action of pump 15 to initially prime or subsequently reprime the first quantity of ink contained in ink supply container 24 of disposable ink jet cartridge 12, or to replenish the first quantity of ink during printing operation. In other respects, the automatic on-demand operation of the preferred second embodiment of the present invention is similar in descriptive detail to that of the preferred first implementation, both in the preferred embodiment and in other embodiments, as previously described.

What is claimed is:

1. An ink refill system for an ink jet printer having a print carriage that traverses across a print medium and is adapted to receive one or more ink jet cartridges, the ink refill system comprising:

a disposable ink jet cartridge removably mountable in the print carriage and constructed as a self-contained unit that includes a print head and an ink supply container that stores a first quantity of liquid ink at a given negative pressure hydrodynamic condition;

an ink reservoir external to the print carriage that stores a second quantity of ink for replenishing the first quantity of ink in the ink supply container;

flexible supply tubing that couples the ink reservoir to the ink supply container to supply ink from the second quantity of ink to the first quantity of ink during operation of the ink jet printer as the print carriage traverses across the print medium; and means for refilling the ink supply container from the ink reservoir during operation of the ink jet printer as the print carriage traverses across the print medium such that the refilling of the ink reservoir is accomplished in a manner that preserves the negative pressure hydrodynamic condition of the ink jet cartridge;

wherein the means for refilling the ink supply container is an on-demand, active system that periodically refills the ink supply container and comprises:
- means for sensing when the first quantity of ink in the ink supply container is below a predetermined threshold;
- means for pumping from a portion of the second quantity of ink from the ink reservoir to the ink supply container in the ink jet cartridge in response to the means for sensing; and
- a foam body having at least a first surface operably coupled to the print head and a second surface onto which the portion of the second quantity of ink is pumped from the supply tubing:

wherein the means for sensing comprises:
- an ink level sensor having at least two electrical contacts, each contact mounted through an aperture in a side surface of the ink jet cartridge and extending into the foam body; and
- circuit means for monitoring a change in the status of the ink level sensor and activating the means for pumping in response to the change.

2. An ink refill system for an ink jet printer having a print carriage that traverses across a print medium and is adapted to receive one or more ink jet cartridges the ink refill system comprising:
- a disposable ink jet cartridge removably mountable in the print carriage and constructed as a self-contained unit that includes a print head and an ink supply container that stores a first quantity of liquid ink at a given negative pressure hydrodynamic condition;
- an ink reservoir external to the print carriage that stores a second quantity of ink for replenishing the first quantity of ink in the ink supply container;
- flexible supply tubing that couples the ink reservoir to the ink supply container to supply ink from the second quantity of ink to the first quantity of ink during operation of the ink jet printer as the print carriage traverses across the print medium; and
- means for refilling the ink supply container from the ink reservoir during operation of the ink jet printer as the print carriage traverses across the print medium such that the refilling of the ink reservoir is accomplished in a manner that preserves the negative pressure hydrodynamic condition of the ink jet cartridge;

wherein the means for refilling the ink supply container is a passive system that continuously refills the ink supply container and wherein the ink reservoir is a sealed vessel and the supply tubing is fixedly coupled to both the ink reservoir and the ink supply container on the ink jet cartridge and wherein the means for refilling the ink supply container comprises:
- means for maintaining a passive pressure differential between the ink reservoir and the ink supply container of the ink jet cartridge wherein the means for maintaining the passive pressure differential is structure supporting the ink reservoir at a height lower than a height of the ink jet cartridges;

the ink refill system further comprising:
- regulating means switchable between an open and closed position and operably coupled to the tubing for controlling flow of ink from the ink reservoir to the ink supply container as needed to continuously replenish the ink supply container of the ink jet cartridge when the regulating means is in the open position.

3. An ink refill system for an ink jet printer having a print carriage that traverses across a print medium and is adapted to receive one or more ink jet cartridges, the ink refill system comprising:
- a disposable ink jet cartridge removably mountable in the print carriage and constructed as a self-contained unit that includes a print head and an ink supply container that stores a first quantity of liquid ink at a given negative pressure hydrodynamic condition;
- an ink reservoir external to the print carriage that stores a second quantity of ink for replenishing the first quantity of ink in the ink supply container;
- flexible supply tubing that couples the ink reservoir to the ink supply container to supply ink from the second quantity of ink to the first quantity of ink during operation of the ink jet printer as the print carriage traverses across the print medium; and
- means for refilling the ink supply container from the ink reservoir during operation of the ink jet printer as the print carriage traverses across the print medium such that the refilling of the ink reservoir is accomplished in a manner that preserves the negative pressure hydrodynamic condition of the ink jet cartridge;

wherein the means for refilling the ink supply container is a passive system that continuously refills the ink supply container and wherein the ink reservoir is a sealed vessel and the supply tubing is fixedly coupled to both the ink reservoir and the ink supply container on the ink jet cartridge and wherein the means for refilling the ink supply container comprises:
- means for maintaining a passive pressure differential between the ink reservoir and the ink supply container of the ink jet cartridge, wherein the means for maintaining the passive pressure differential is structure supporting the ink reservoir at a height lower than a height of the ink jet cartridges;
- wherein the regulating means comprises an in-line stopcock with a pressure wheel for pinching the supply tubing closed when the stopcock is in a closed position.

4. An ink refill system for an ink jet printer having a reciprocating print carriage that traverses across a print medium, the print carriage being adapted to receive at least six ink jet print heads, the ink refill system comprising:
- a first ink jet print head removably mountable in a print carriage and constructed as a self-contained unit that includes a plurality of ink emitting nozzles for discharging ink toward the print medium and an internal ink supply container that stores a first quantity of liquid ink at a given sub-atmospheric pressure hydrodynamic condition, the first ink jet print head being free of a foam body internal to the first ink jet print head and free of capillary action;
- an ink reservoir that stores a second quantity of ink for replenishing the first quantity of ink in the internal ink supply container; and
- a length of flexible tubing, operatively coupled to the ink reservoir at a first end of the length of flexible tubing and at a second end of the length of flexible tubing to the ink supply container, for supplying ink from the second quantity of ink to the first quantity of ink during operation of the ink jet printer as the print carriage traverses across the print medium, wherein the sub-atmospheric pressure hydrodynamic condition refills the internal ink supply container from the ink reservoir during operation of the ink jet printer by passive pressure differential maintaining the sub-atmospheric pressure hydrodynamic condition of the first ink jet print head, and wherein the internal supply container moves relative to the ink reservoir as the print carriage traverses across the print medium.

5. The ink refill system of claim 4, wherein the reciprocating print carriage is adapted to support at least eight ink jet print heads.

6. The ink refill system of claim 4, wherein the reciprocating print carriage is adapted to support at least twelve ink jet print heads.

7. The ink refill system of claim 4, wherein the ink reservoir comprises a sealed vessel, and the length of flexible tubing is fixedly coupled to the ink reservoir at the first end and at the internal ink supply container at the second end.

8. The ink refill system of claim 7, wherein the ink reservoir is supported at a height lower than a height of the first ink jet print head.

9. The ink refill system of claim 8, further comprising regulating means, switchable between an open and closed position and operably coupled to the length of flexible tubing for controlling flow of ink from the ink reservoir to the internal ink supply container as needed to continuously replenish the internal ink supply container of the first ink jet print head when the regulating means is in the open position.

10. The ink refill system of claim 9, wherein the regulating means comprises an in-line stopcock with a pressure wheel for pinching the tubing closed when the stopcock is in a closed position.

11. An ink refill system for an ink jet printer, the ink refill system comprising:

at least five ink jet print head units removably mountable in a print carriage and each of said at least five ink jet print heads constructed as a self-contained unit that includes means for discharging individual ink droplets toward a print medium and an internal ink supply means for storing a first quantity of liquid ink at a given sub-atmospheric pressure hydrodynamic condition, the internal ink supply means being free of a foam body internal to the internal ink supply means;

at least five ink reservoir units that store a second quantity of ink for replenishing the first quantity of ink in the internal ink supply means in a corresponding one of said at least five ink jet print heads; and at least five lengths of flexible tubing, wherein each of said at least five lengths of flexible tubing is operatively coupled to one of said at least five ink reservoir units at a first end and connected to said internal ink supply means, for supplying ink from the second quantity of ink to the first quantity of ink during operation of each of said at least five ink jet print head units as the print carriage traverses across the print medium, wherein the sub-atmospheric pressure hydrodynamic condition refills the internal ink supply container from each of said at least five ink reservoir units during operation of the ink jet printer by passive pressure differential maintaining the sub-atmospheric pressure hydrodynamic condition of each of said at least five ink jet print head units, and wherein the internal ink supply means moves relative to each of said at least five ink reservoir units as the print carriage traverses across the print medium.

12. The ink refill system of claim 11, wherein the at least five ink reservoir units comprises a sealable vessel, and each of said at least five lengths of flexible tubing are each fixedly coupled to a corresponding one of at least five ink reservoir units and at said internal ink supply means.

13. The ink refill system of claim 12, wherein structure supporting each of said at least five ink reservoir units supports said at least five ink reservoir units at a height lower than a height of the at least five ink jet print head units.

14. The ink refill system of claim 13, further comprising regulating means, switchable between an open and closed position and operably coupled to each of said at least five lengths of flexible tubing for controlling flow of ink from each of said at least five ink reservoir units to the internal ink supply means as needed to continuously replenish the internal ink supply means of the at least five ink jet print head units when the regulating means is in the open position.

15. The ink refill system of claim 14, wherein the regulating means comprises an in-line stopcock with a pressure wheel for pinching the tubing closed when the stopcock is in a closed position.

16. A continuous ink refill system for ink jet printers, comprising:

ink emitting means for generating colored ink droplets onto a printing substrate wherein the ink emitting means is sealed to ambient pressure conditions and constructed to retain a sub-ambient atmospheric condition in an internal ink reservoir;

a length of flexible tubing sealingly coupled to the internal ink reservoir at a first end;

a remote ink reservoir means for storing a unit volume of ink, wherein the remote ink reservoir is sealingly coupled to a second end of said length of flexible tubing;

wherein during emission of ink from the ink emitting means a portion of the volume of ink in the remote ink reservoir means is drawn through the length of flexible tubing and into the internal ink reservoir without capillary action until the ink emitting means generates colored ink droplets from the unit volume of ink stored in the remote ink reservoir means.

17. The continuous ink refill system of claim 16, wherein the remote ink reservoir means is an integral vessel.

18. The continuous ink refill system of claim 17, wherein the integral vessel is open to ambient pressure conditions.

19. The ink refill system of claim 16, further comprising regulating means, switchable between an open and closed position and operably coupled to said length of flexible tubing for controlling flow of ink from the remote ink reservoir means to the internal ink reservoir as needed to continuously replenish the internal ink reservoir when the regulating means is in the open position.

20. The ink refill system of claim 19, wherein the regulating means comprises an in-line stopcock with a pressure wheel for pinching the tubing closed when the stopcock is in a closed position.

21. The continuous ink refill system of claim 16, wherein the ink emitting means is a thermal ink jet print head.

22. The continuous ink refill system of claim 21, wherein the thermal ink jet print head is a disposable thermal ink jet print head.

23. The continuous ink refill system of claim 22, wherein the thermal ink jet print head has a resolution expressed in dots per inch of at least three hundred dots per inch.

* * * * *